No. 782,432. PATENTED FEB. 14, 1905.
J. ANDERSON.
MACHINE FOR MAKING CAN BODIES.
APPLICATION FILED SEPT. 10, 1904.

3 SHEETS—SHEET 1.

Witnesses:
Arthur Gumpe
F. Unfucht

Inventor:
John Anderson
by Franks v Biesen Atty

No. 782,432. PATENTED FEB. 14, 1905.
J. ANDERSON.
MACHINE FOR MAKING CAN BODIES.
APPLICATION FILED SEPT. 10, 1904.
3 SHEETS—SHEET 2.
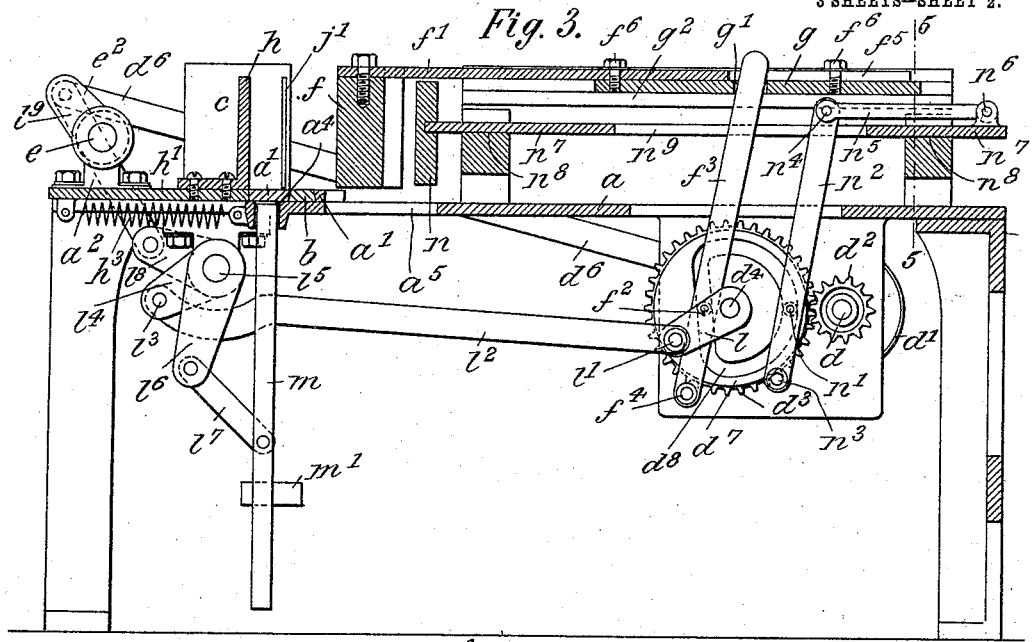
Fig. 3.
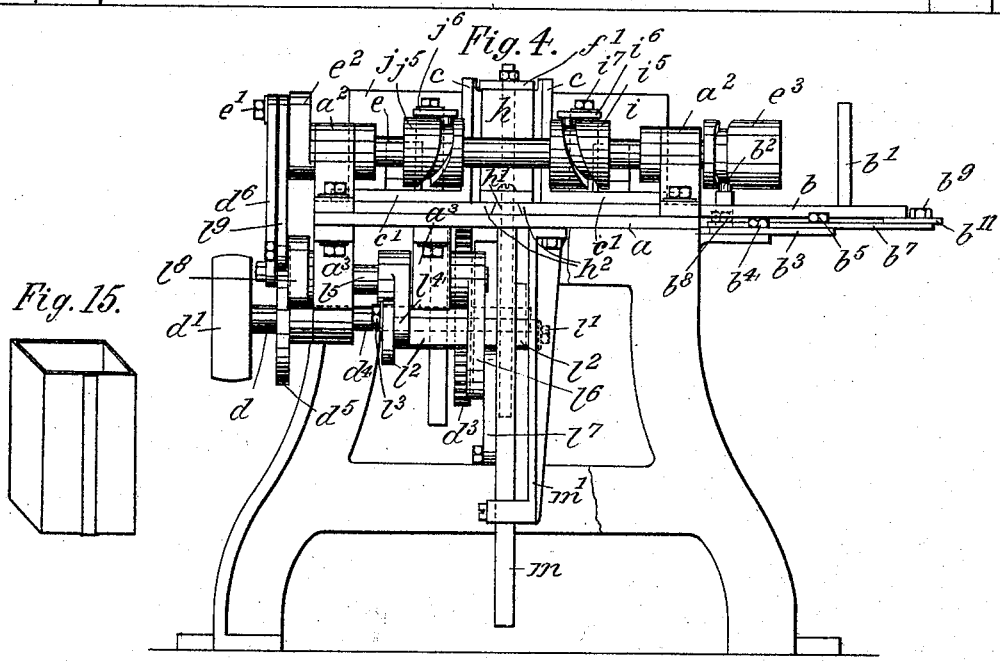
Fig. 4.
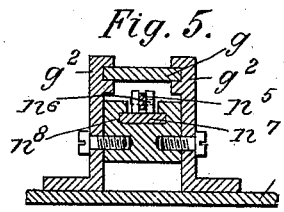
Fig. 15.
Fig. 5.
Witnesses:
Arthur Geuyer
F. Unfricht
Inventor:
John Anderson
by Frank Briesen Atty.

No. 782,432. PATENTED FEB. 14, 1905.
J. ANDERSON.
MACHINE FOR MAKING CAN BODIES.
APPLICATION FILED SEPT. 10, 1904.

3 SHEETS—SHEET 3.

Witnesses:
Arthur Gumpe
F. Unfricht

Inventor:
John Anderson
by Hauff Briesen Atty

No. 782,432. Patented February 14, 1905.

UNITED STATES PATENT OFFICE.

JOHN ANDERSON, OF NEW YORK, N. Y., ASSIGNOR OF ONE-HALF TO SAMUEL ORLINSKY, OF NEW YORK, N. Y.

MACHINE FOR MAKING CAN-BODIES.

SPECIFICATION forming part of Letters Patent No. 782,432, dated February 14, 1905.

Application filed September 10, 1904. Serial No. 223,974.

*To all whom it may concern:*

Be it known that I, JOHN ANDERSON, a citizen of Sweden, residing at New York city, (Brooklyn,) county of Kings, and State of New York, have invented new and useful Improvements in Machines for Making Can-Bodies, of which the following is a specification.

This invention relates to an improved machine for forming sheet-metal can-bodies from blanks having flanged ends.

The machine folds the blank into square, round, or other form, interlocks the flanges, and compresses the seam, so that a continuous bottomless can-body is produced.

Briefly stated, the machine operates as follows: The blank is, by a slide, centered across the open front of a matrix, into which it is forced by a core. The two ends of the blank are bent inward to overlap, and then the blank is expanded laterally by means of an interior spreader, so that the flanged ends become interlocked. These ends are finally flattened by a plunger which closes the seam and completes the operation.

Figure 1:
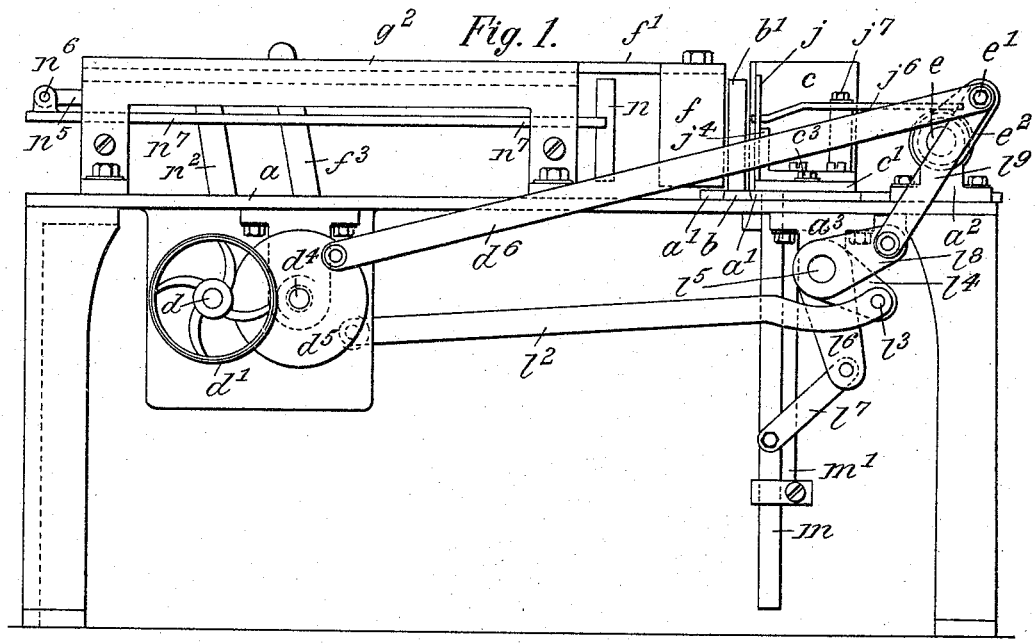
Figures 2, 6, 7:
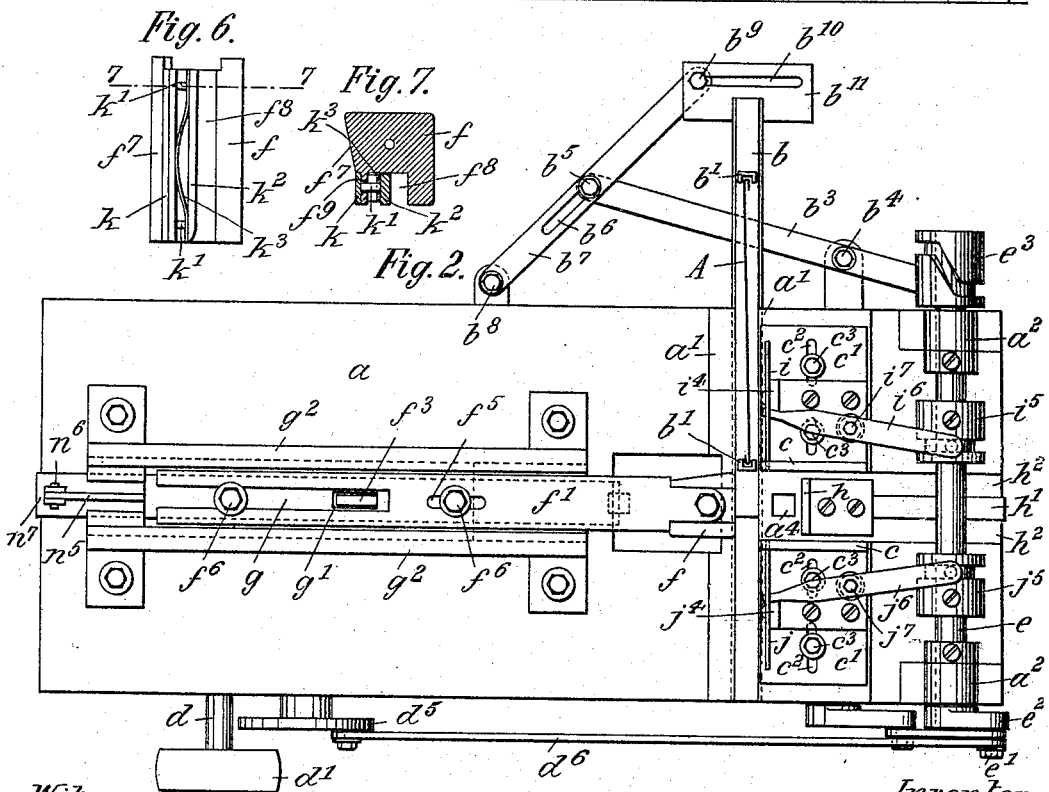
Figure 8:
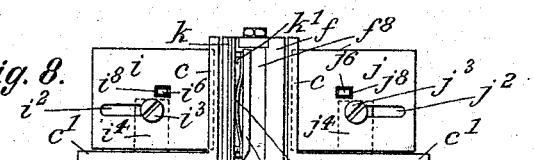
Figures 9, 10:
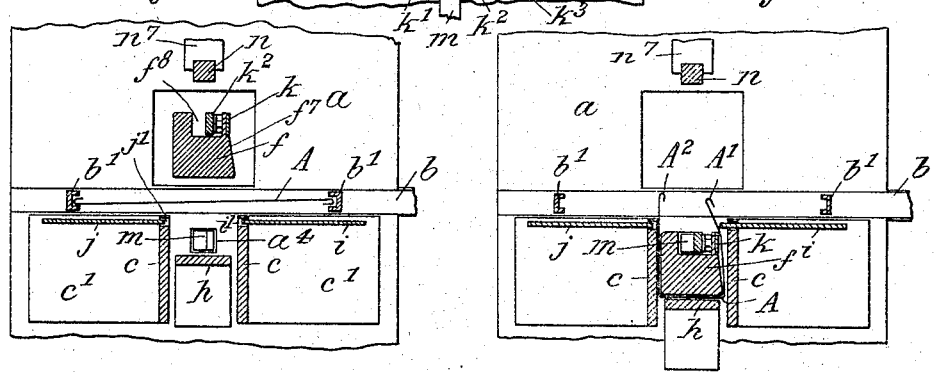

In the accompanying drawings, Figure 1 is a side elevation of my improved machine for making can-bodies; Fig. 2, a plan thereof; Fig. 3, a vertical longitudinal section, partly in elevation; Fig. 4, an end view; Fig. 5, a section on line 5 5, Fig. 3; Fig. 6, a detail of the core and spreader; Fig. 7, a section on line 7 7, Fig. 6; Fig. 8, a detail elevation of the matrix and folders. Figs. 9 to 14 are diagrams showing consecutive positions of the operative parts of the machine, and Fig. 15 is a perspective view of a can-body made by the machine.

The letter $a$ represents the work-table of the machine, across which moves along guide-rails $a'$ a slide $b$, having grooved posts $b'$ for the reception of the blank A. The slide is free to travel across the front open end of a matrix, which is also open at the back and is shown to consist of two parallel plates $c$. These plates have bottom flanges $c'$, slotted at $c^2$ for the reception of clamp-screws $c^3$, by means of which the plates are adjustably secured to base-plate $a$. By this construction the machine may be set to different sizes of can-bodies.

$d$ is the power-shaft, having driving-pulley $d'$ and adapted to intermittently reciprocate slide $b$ in the following manner: Upon shaft $d$ is mounted a pinion $d^2$, Fig. 3, that meshes into gear-wheel $d^3$ of a counter-shaft $d^4$. Shaft $d^4$ carries crank-disk $d^5$, to which is connected one end of a rod $d^6$, Fig. 1. The other end of this rod is engaged by a wrist-pin $e'$, projecting from the crank $e^2$ of a rotating cam-shaft $e$, journaled in bearings $a^2$. By means of the construction described a rotating movement may be imparted to shaft $e$ from shaft $d$, the dead-center being overcome in manner hereinafter described. Upon shaft $e$ is mounted a cam $e^3$, that engages a pin $b^2$ at one end of a lever $b^3$, Fig. 2, fulcrumed at $b^4$. The other end of lever $b^3$ has a pin $b^5$, which engages the slot $b^6$ of a lever $b^7$, fulcrumed at one end, as at $b^8$. The other end of lever $b^7$ is provided with a pin $b^9$, which engages a slot $b^{10}$, formed in a head $b^{11}$ of slide $b$. The cam $e^3$ will oscillate lever $b^3$ which will in turn oscillate lever $b^7$. The latter will impart the desired intermittent reciprocating movement to slide $b$.

Into the open front of matrix $c$ is free to enter a reciprocating core or former $f$, which forces the blank A into the matrix, and thus bends it into a U shape. The core $f$ is carried by an arm $f'$, to which intermittent reciprocating movement is imparted in such a manner that the core is alternately projected into and withdrawn from the matrix. The means for operating arm $f'$ are as follows: Upon counter-shaft $d^4$ is mounted a cam $d^7$, having groove $d^8$, which is engaged by a pin $f^2$ of a lever $f^3$, fulcrumed at $f^4$. The upper end of lever $f^3$ extends into an opening $g'$ of a slide $g$, guided between a pair of longitudinal rails $g^2$, which are mounted upon bed-plate $a$, Fig. 5. The arm $f'$ is slotted at $f^5$ for the reception of clamp-screws $f^6$, by which the arm $f'$ may be adjustably connected to slide $g$. The rotating movement of the power-shaft $d$ will by cam $d^7$ oscillate lever $f^3$, and the latter will in turn impart the desired intermittent reciprocating movement to slide $g$, and consequently to core $f$. The peculiar construction of the core $f$ will be described further below.

Into the open back of matrix $c$ enters a rest or abutment $h$, which is adapted to engage the back of the can-body and to coöperate with the core $f$ in shaping the same. The rest $h$ extends upwardly from a slide $h'$, guided between rails $h^2$ and influenced by a spring $h^3$. When the core $f$ advances into the matrix $c$, the back of the blank A will be compressed between core and rest, the latter being pushed forward by the core against the action of spring $h^3$. When the core recedes and clears the matrix, the rest will be advanced to its normal position by its spring $h^3$, Fig. 3. The object of the rest $h$ is to furnish a resistance against which the blank A is forced by the core $f$, so that any bulging of the rear of the blank is prevented.

After a U shape has been imparted to the blank in the manner described its ends are successively folded inward, so as to overlap. One of these ends has an outwardly-opening hook or flange A', while the other end has an inwardly-opening hook or flange A², and the operation of the machine is such that the former will be folded slightly in advance of the latter. The folding of the blank is effected by a pair of plates or folders $i$ $j$, which are adapted to be projected partly across the open front of matrix $c$ and are reciprocated at right angles to core $f$. The folders $i$ $j$ pass through openings $i''$ $j''$ of the matrix, Figs. 3 and 9, and are provided with slots $i^2$ $j^2$ for the admission of pins $i^3$ $j^3$, that extend forward from guides $i^4$ $j^4$, carried by flanges $c'$. To reciprocate folders $i$ $j$, I mount upon shaft $e$ a pair of cams $i^5$ $j^5$, engaged by levers $i^6$ $j^6$, which are fulcrumed at $i^7$ $j^7$ and enter perforations $i^8$ $j^8$ of the folders. In this way the rotating movement of shaft $e$ is converted into a reciprocating movement of folders $i$ $j$. The cam $i^5$ is so set in relation to cam $j^5$ that the movement of folder $i$ slightly precedes that of folder $j$.

Figures 11, 12:
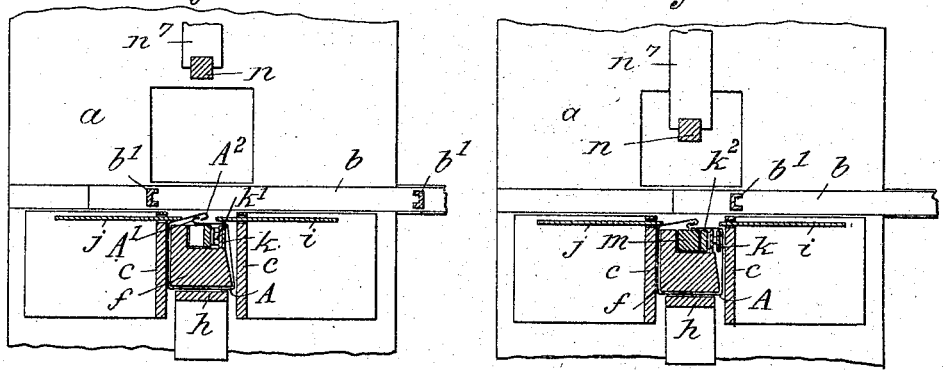
Figures 13, 14:
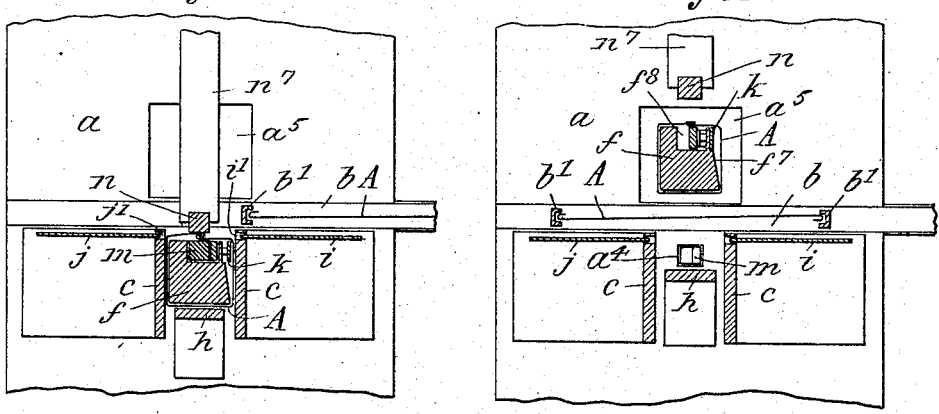

As thus far described, the ends of the blank are so bent that each flange A' or A² is brought opposite the gutter of the opposing flange, Fig. 11. It is now necessary to expand the blank laterally by interior pressure, so that the flanges become hooked together or interlocked. This is effected in the following manner: One side of the plunger $f$ is chamfered, as at $f^7$, Fig. 7, so that the front of the core is narrower than its back. This chamfered side is recessed to accommodate a plate or spreader $k$, which is adapted to be projected laterally outward and correspondingly distend the blank folded around the core. The spreader $k$ is connected by pins $k'$ to a plate $k^2$, contained within a hollow or cavity $f^8$ of core $f$, the pins $k'$ passing through perforations $f^9$ of core $f$. The plate $k^2$ is normally forced inward by a spring $k^3$, which thus serves to seat spreader $k$. In order to move the plate $k^2$, and consequently the spreader $k$, outward and expand the blank in the manner described, I have devised the following construction: The shaft $d^4$ is provided with an arm $l$, connected at $l'$ to one end of a bent connecting-rod $l^2$, the other end of which is connected at $l^3$ to the crank $l^4$ of a rock-shaft $l^5$, journaled in bearings $a^3$. An arm $l^6$ of rock-shaft $l^5$ is connected by link $l^7$ to a vertically-movable rod or expander $m$. This rod is guided at its lower end in a bracket $m'$, depending from table $a$, while its upper end enters an opening $a^4$ of said table, which is located within the matrix $c$, Fig. 2. The rod $m$ is so shaped that it will fill the cavity $f^8$ of core $f$, and thereby crowd the plate $k^2$, and consequently the spreader $k$, outward, while the timing of the machine is such that the rod $m$ is raised after the core $f$ has been advanced into the matrix and after the folders $i$ $j$ have turned the ends of the blank inward. The ascent of the rod $m$ will thus by moving the spreader $k$ outward swell the core $f$ in such a manner that the folded blank is expanded to its maximum extent and its bent ends A' A² are interlocked, Fig. 12.

The rock-shaft $l^5$ has an arm $l^8$, connected by link $l^9$ to the wrist-pin $e'$ of crank-shaft $e$, which construction serves to overcome the dead-center of the latter.

After the flanges A' A² have become interlocked in the manner described they are compressed to close the seam and complete the operation. This is effected by means of a plunger $n$, which is adapted to bear against the overlapped flanges and force the same against rod $m$, so that the seam is flattened and a tight joint is formed. The plunger $n$ is operated in the following manner: The groove $d^8$ of cam $d^7$ is engaged by a pin $n'$ of a lever $n^2$, fulcrumed at $n^3$. The upper end of this lever is connected at $n^4$ to one end of a link $n^5$, the other end of which is pivoted at $n^6$ to a slide $n^7$, that carries the plunger $n$. The slide $n^7$ is guided in ways $n^8$ between the rails $g^2$, Fig. 5, and is slotted longitudinally, as at $n^9$, for accommodating lever $f^3$. In this way the rotation of cam $d^7$ will impart an intermittent reciprocating movement to slide $n^7$, and consequently to plunger $n$.

The operation is as follows: The slide $b$, being in its terminal position, is charged with the blank A, Fig. 2, and is then moved laterally to center the blank in front of matrix $c$, Fig. 9. The core $f$ is advanced to bend the blank into the U shape and against the rest $h$. The first folder $i$ is projected inward, Fig. 10, to turn over flanged end A', and after the first folder has started the second folder $j$ is projected inward to fold flanged end A² over flanged end A', Fig. 11. The expander $m$ ascends into cavity $f^8$ of core $f$ and forces spreader $k$ outward to swell the core and expand the folded blank, so that the flanges A' A² become interlocked, Fig. 12. Meanwhile the slide $b$ has receded to its initial position ready to be charged with a new blank and the folders have been withdrawn. The plunger $n$ advances to flatten the seam and close the joint, Fig. 13, after which it recedes and the expander $m$ descends. After the expander has cleared the core the spreader $k$ is retracted by its spring $k^3$, and the core $f$, together with the surrounding can-body, is by the back stroke of slide $g$ withdrawn from matrix $c$. The core carries the can-body vertically over a discharge-opening $a^5$ of bed-plate $a$, Fig. 14, through which the can-body drops into a suitable receptacle. Meanwhile the slide $b$ has been advanced to center a new blank in front of the matrix ready for the next advance of the core.

What I claim is—

1. In a machine for making can-bodies, the combination of a matrix with a recessed core, a spreader having a plate within the core, and an expander adapted to enter the core and engage the plate, substantially as specified.

2. In a machine for making can-bodies, the combination of a matrix with a chamfered recessed perforated core, a spring-influenced spreader, a plate within the core, pins connecting said plate to the spreader, and an expander adapted to enter the core and engage the plate, substantially as specified.

3. In a machine for making can-bodies, the combination of a matrix with a recessed core, a pair of folders, a spreader connected to the core, an expander adapted to enter the core, and a plunger adapted to be projected against the expander, substantially as specified.

4. In a machine for making can-bodies, the combination of a matrix with a recessed core, a pair of folders, a slidable rest, a spreader connected to the core, an expander adapted to enter the core, and a plunger adapted to be projected against the expander, substantially as specified.

5. In a machine for making can-bodies, the combination of a slide adapted to receive the can-blank with a matrix, a recessed core, a pair of folders, a slidable rest, a spreader connected to the core, an expander adapted to enter the core, and a plunger adapted to be projected against the expander, substantially as specified.

Signed by me at New York city, (Manhattan,) New York, this 9th day of September, 1904.

JOHN ANDERSON.

Witnesses:
    WILLIAM SCHULZ,
    FRANK V. BRIESEN.